W. R. JONES.
FRAME FOR AGRICULTURAL MACHINES.
APPLICATION FILED APR. 18, 1913.
1,116,709. Patented Nov. 10, 1914.
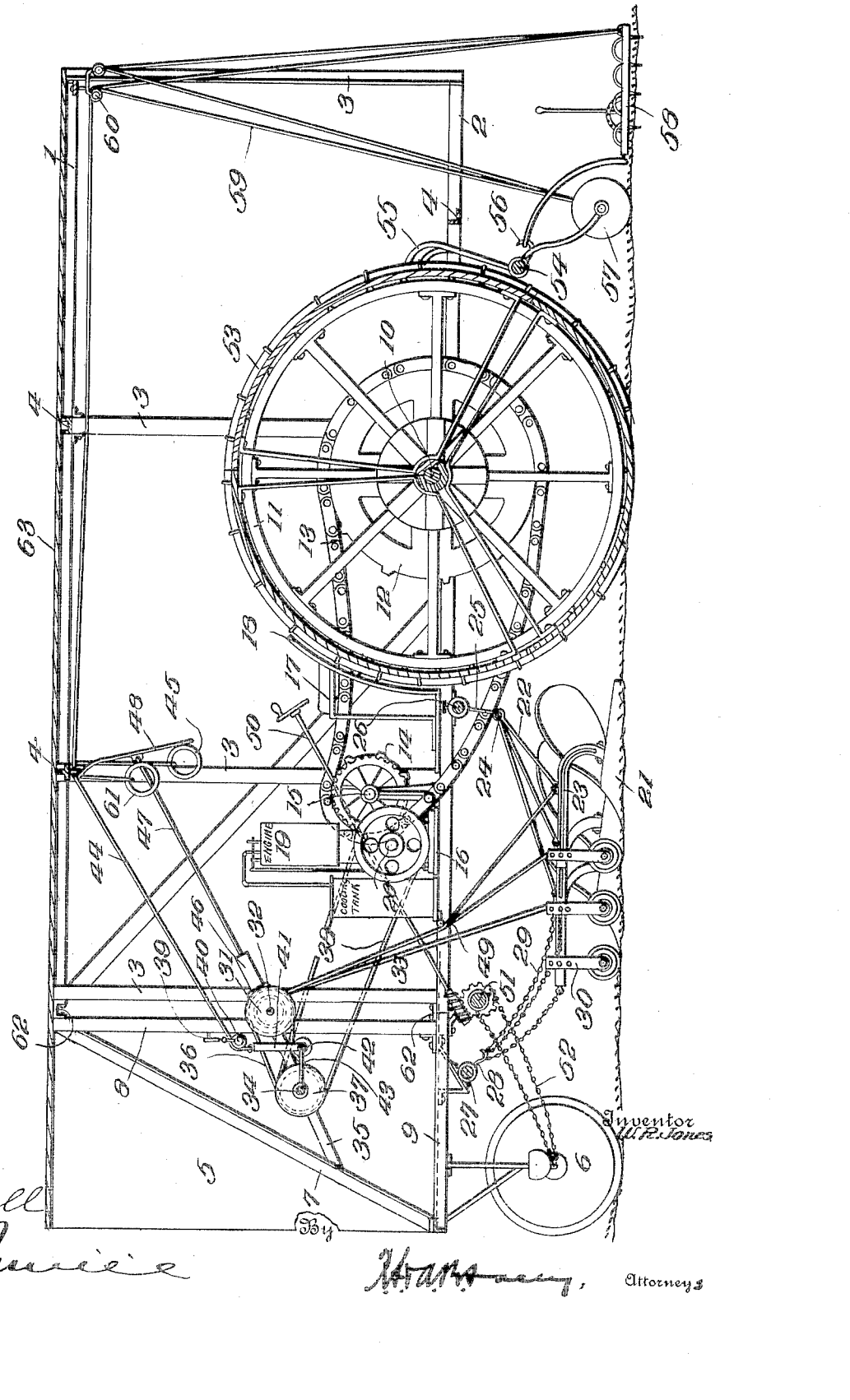

UNITED STATES PATENT OFFICE.

WILLIAM R. JONES, OF MARION, MICHIGAN.

FRAME FOR AGRICULTURAL MACHINES.

1,116,709. Specification of Letters Patent. Patented Nov. 10, 1914.

Original application filed March 29, 1912, Serial No. 687,192. Divided and this application filed April 18, 1913. Serial No. 762,159.

*To all whom it may concern:*

Be it known that I, WILLIAM R. JONES, a citizen of the United States, residing at Marion, in the county of Osceola and State of Michigan, have invented certain new and useful Improvements in Frames for Agricultural Machines, of which the following is a specification.

This application is a division of an application filed by me March 29, 1912, Serial No. 687,192, and the object of the present invention is to provide a frame for motor-driven agricultural machines of such construction that it may be readily arranged to carry plows and other soil-treating implements with means for adjusting the same or to support a mower or other harvesting machines.

The invention is illustrated in the accompanying drawing and will be hereinafter fully described, the novel features being particularly pointed out in the claims following the description.

The drawing shows a longitudinal vertical section of a machine embodying the invention.

The present invention comprises a supporting frame or truck consisting of upper and lower side bars 1 and 2 preferably formed of angle iron and connected by said spaced uprights 3 to which are rigidly secured transverse bars 4. The supporting frame or truck is provided with a detachable extension 5 on which are pivotally mounted the steering wheels 6, said extension being provided with rearwardly inclined braces 7 having their upper ends connected to uprights 8 similar in construction to the uprights 3, and lower side bars 9 which form a continuation of the lower side bars of the truck when the main frame of the machine is used as a plow or grain drill.

Journaled in suitable bearings on the side bars 2 of the truck or main frame is a rear axle 10 on which are mounted traction wheels 11. Each traction wheel is provided with a sprocket wheel 12 over which extends a sprocket driving chain 13 leading to a relatively small sprocket wheel 14 mounted on a shaft 15 which is disposed transversely of the truck, as will be readily understood. Resting on the lower side bars of the truck is a platform 16 having a seat 17 thereon and provided with an upwardly and rearwardly extending plate 18 which forms a guard for the traction wheels. An engine or other suitable motor 19 is also mounted on the platform and the driving shaft 20 of the motor extends transversely of the truck and is connected with the shaft 15 by any convenient or preferred form of gearing whereby, when the driving shaft 20 is rotated, the traction wheels may be set in motion and the truck caused to travel forwardly or rearwardly. This gearing may also be provided with suitable clutches to that, if desired, the traction wheels may remain stationary and the engine permitted to run free or be utilized to drive any desired machinery.

Arranged below the platform 20 are plows 21 preferably disposed in stepped relation and each provided with a rearwardly extending arm 22, the lower end of which is pivotally attached to the adjacent plow beam 23 and the upper end of which is pivotally connected at 24 to a short link 25 suspended from a transverse bar or rod 26 which is mounted upon the truck frame in advance of the traction wheels. The links 25 are pivotally mounted on the rod or bar 26 and may be adjusted laterally if so desired. Carried by the extension frame is a transverse draft bar 27 to which are secured a plurality of hooks 28, each hook receiving a draft chain 29 leading to the adjacent plow beam, as shown.

It will be readily noted that by reason of the described pivotal connections the plows are free to move forwardly and upwardly so as to conform to any irregularities in the surface over which the machine is traveling and they are also movable independently of each other so that should one plow strike an obstruction the other plows will not be affected. This manner of suspending the plows, moreover, permits them to pass over hilly or rolling ground and produce an even furrow of uniform depth regardless of the surface contour of the soil.

Depending from each plow beam is a caster wheel 30 having its shank provided with a plurality of openings through any one of which a pin or similar fastening device may be inserted into the plow beam so that the depth of penetration of the plow point may be regulated at will.

As a means for raising and lowering the plows successively so as to leave the ends of the furrows in transverse alinement at the opposite sides of a field, I provide a plurality of winding drums 31 rotatably mounted on a stationary shaft 32, and to each drum is secured the adjacent end of a cord, chain or other flexible medium 33 which extends down to and is fastened to the adjacent plow beam, as shown. The stationary shaft 32 is rigidly secured to the uprights 8 of the extension frame, and disposed in a plane slightly below and in advance of said shaft is a rotating shaft 34 which is journaled in suitable brackets or other supports 35 on the extension frame. Rigidly secured to the said rotating shaft 34 is a series of wheels or pulleys over which extend endless belts 36 leading to and encircling the pulleys of the adjacent winding drums 31. Secured to one end of the shaft 34 is a belt pulley 37 over which extends a belt 38 which leads to and around a suitable pulley on the driving shaft 20 so that motion may be transmitted from the engine to the said shaft 34.

Arranged above and in a plane between the planes of the shafts 32 and 34 a cross bar 39 is secured upon the uprights 8 of the extension frame and a series of pulleys 40 are suspended from said bar. A yoke or hanger 41 is disposed below each pulley 40 and carries an idler 42 at its lower end, said yoke or hanger being provided with arms 43 which encircle the shaft 34 on opposite sides of the adjacent pulley so that the idler 42 may be moved into and out of engagement with the belt 36. These yokes or hangers are carried by cords or chains 44 which extend over the pulleys 40 and are attached respectively to the upper ends of the several yokes or hangers and extend upwardly and rearwardly from the said pulleys 40 to suitable guides on one of the transverse bars 4 of the main frame, the free ends of the said cords depending from the said guides and being equipped with rings 45 so that the said cords may be easily manipulated from the seat 17. It will be readily seen that by pulling downwardly upon any one ring 45 the cord attached thereto will be caused to lift the yoke or hanger carried by its forward end so that the corresponding idler will be drawn against the adjacent belt 36 which will thereby be tightened so as to rotate the winding drum over which it passes and, consequently, effect movement of the plow connected with said drum.

The casing of the winding drum is provided with a tubular extension 46 in which is slidably mounted a locking rod 47 which is constructed to automatically engage the drum and hold the same against rotation when a plow has been raised. The rear end of the locking rod is pivoted to a lever 48 which is suspended upon one of the transverse bars 4 of the main frame and is disposed within convenient reach of the person occupying the seat 17 so that, if the said lever be swung rearwardly, the locking rod will be withdrawn from engagement with the winding drum and the weight of the plow will then cause the same to descend. A plurality of small rollers 49 are provided at the front edge of the platform 16 to prevent frictional wear between the said edge of the platform and the lifting cables 33, as will be readily understood. A steering head 50 is also provided near the operator's seat and connected with a transverse shaft 51 to which are secured steering chains 52 leading to the wheels 6 so that the truck may be guided in the usual manner.

A cylindrical pulverizing drum or packer 53 is provided, and said drum is preferably formed of sections detachably united and adapted to be secured to the axle 10 so as to rotate therewith. In rear of the packer a transverse rod 54 is carried by the main frame and scrapers or fingers 55 rise from the said rod and bear upon the packer so as to prevent dirt adhering thereto and thereby clogging or otherwise obstructing the operation of the same. This rod 54 is also provided with a plurality of hooks 56 from which are suspended one or more disk harrows 57 and drag harrows 58. Hoisting cables 59 are attached to said harrows and extend over guide pulleys 60 at the rear end of the main frame and thence forwardly to suitable guides on the forward transverse bar 4 where their free ends are equipped with rings 61 so that the operator may raise or lower the harrows by pulling upon the proper hoisting cables. It will be readily seen that as the machine is caused to travel forwardly over a field the plows will turn the soil, while the packer drum will pulverize and pack the same and the harrows in turn act thereon so that the soil will be placed in condition for planting.

The extension frame is secured to the main frame by couplings 62 interposed between and detachably secured to the adjacent uprights 3 and 8 so that, if it be desired to use a mowing machine or a harvester, the couplings may be detached and the extension frame then removed from the main frame. When the extension frame is removed, the plows and the means for raising and lowering the same will, of course, be also removed, it being understood that the links 25 are previously detached from the rod 26 and the cords 44 and levers 48 removed from the supporting bar 4, while the belt 38 is, of course, slipped out of engagement with the pulley 37. The steering wheels will then be detached from the extension frame and bolted to the lower side bars of the main frame below or immediately in advance of the platform and a shorter steering head 50 connected therewith. The harvester or mowing mechanism may then be readily secured to the front end of the main frame and the machine driven over the field, the driving shaft of the engine being suitably connected with the operating parts of the harvester or mower so as to actuate the same. The harrows will, of course, be removed when the frame is to carry a harvester or mower and the packer cylinder will preferably be removed, although, if so desired, it may be utilized as the traction wheel. If the plows, packer and harrows be removed and the steering wheels placed under the platform or under the front end of the main frame, as described, the machine may be used as a traction engine for general farm use. It will be understood that the driving shaft of the engine will be equipped with suitable pulleys so that the power of the same may be transmitted to threshers or other machinery. A cover 63 is preferably provided, which serves to house and protect the operating mechanism, as indicated.

What I claim is:—

1. An agricultural machine including a truck frame having spaced uprights secured thereto and provided with traction wheels, an extension forming a part of the truck frame and provided with rigidly united inclined and vertical uprights, steering wheels mounted on the extension of the truck frame, means for detachably securing the uprights of the extension to the adjacent uprights of the truck frame, a gang of plows suspended from the truck frame, means mounted on the extension of the truck frame and operatively connected with the plows for raising and lowering the latter, a draft device carried by said extension, and flexible draft elements forming a connection between the draft device and plows.

2. In an agricultural machine, the combination of a main frame having uprights at its front end, traction wheels thereon, means on said frame to actuate said traction wheels, an extension frame having uprights, and rigid couplings detachably secured to the uprights of the extension frame and the uprights at the front end of the main frame.

In testimony whereof I affix my signature in presence of two witnesses.

WILLIAM R. JONES. [L. S.]

Witnesses:
R. A. LEWIS.
F. D. ELLIOTT.